(12) United States Patent  
Tiamson et al.

(10) Patent No.: US 6,769,339 B2
(45) Date of Patent: Aug. 3, 2004

(54) DIE SET PIN RETAINER

(75) Inventors: Nick Tiamson, Chicago, IL (US); Samuel Amdahl, Des Plaines, IL (US)

(73) Assignee: General Binding Corporation, Northbrook, IL (US)

( * ) Notice: Subject to any disclaimer, the term of this patent is extended or adjusted under 35 U.S.C. 154(b) by 0 days.

(21) Appl. No.: 10/179,090

(22) Filed: Jun. 25, 2002

(65) Prior Publication Data

US 2002/0194973 A1 Dec. 26, 2002

Related U.S. Application Data

(60) Provisional application No. 60/300,631, filed on Jun. 25, 2001.

(51) Int. Cl.[7] .................................................. B26F 1/14
(52) U.S. Cl. ......................... 83/618; 83/687; 83/698.91
(58) Field of Search ........................ 83/372, 364, 212, 83/468, 549, 571, 618, 628, 698.91, 687, 634, 620, 698.81, 691, 599, 523; 412/9, 11, 16; 234/38, 131

(56) References Cited

U.S. PATENT DOCUMENTS

| | | |
|---|---|---|
| 807,295 A | 12/1905 | Lincoln |
| 2,039,251 A | 4/1936 | Knight |
| 2,481,883 A | 9/1949 | Semler |
| 2,745,492 A | 5/1956 | Brook |
| 2,957,380 A | 10/1960 | Duncan et al. |
| 3,060,780 A | 10/1962 | Stuckens |
| 3,083,604 A | 4/1963 | Ferren |
| 3,452,925 A | 7/1969 | Gettle et al. |
| 3,477,317 A | 11/1969 | Liander |
| 3,500,710 A | 3/1970 | Taber |
| 3,512,435 A | 5/1970 | Bossmann et al. |
| 3,559,522 A | 2/1971 | Valente |
| 3,631,753 A | 1/1972 | Hall et al. |
| 3,673,908 A | 7/1972 | Smith |
| 3,750,502 A | 8/1973 | Ball |
| 3,793,660 A | 2/1974 | Sims |
| 3,808,933 A | 5/1974 | Buan |
| 3,811,146 A | 5/1974 | Abildgaard et al. |
| 3,908,498 A | 9/1975 | Seaborn |
| 3,945,073 A | 3/1976 | Adams |
| 3,948,129 A | 4/1976 | Plegat |
| 3,967,336 A | 7/1976 | Cutter |
| 3,985,056 A | 10/1976 | Oseto |
| 4,000,673 A | 1/1977 | Lyon |
| 4,014,232 A * | 3/1977 | Mauger ........................ 83/144 |
| 4,033,037 A | 7/1977 | Cooley |
| 4,044,946 A | 8/1977 | Cless et al. |
| 4,079,647 A * | 3/1978 | Elder et al. ................. 83/441.1 |
| 4,270,970 A | 6/1981 | Szanto et al. |
| 4,354,783 A | 10/1982 | Szanto |
| 4,434,690 A | 3/1984 | Mauer |
| 4,442,743 A | 4/1984 | Szanto |
| 4,449,436 A | 5/1984 | Semerjian et al. |
| 4,480,782 A | 11/1984 | Morishima |

(List continued on next page.)

FOREIGN PATENT DOCUMENTS

| | | |
|---|---|---|
| DE | 32 30 312 A1 | 2/1984 |
| EP | 0 540 828 A1 | 5/1993 |

*Primary Examiner*—Allan N. Shoap
*Assistant Examiner*—Ghassem Alie
(74) *Attorney, Agent, or Firm*—Leydig, Voit & Mayer, Ltd.

(57) ABSTRACT

A die pin retainer subassembly for use in a die assembly that slidably engages with a die punching machine comprises an elongated retainer, which includes at least one hole for receiving a die pin, and an elongated retaining bar disposed over the enlarged head of the die pin. At least one of the retainers on the retaining bar is in the form of a channel and the retainer and the retaining bar are sized and configured to nest along the lateral direction to minimize any relative lateral movement.

23 Claims, 10 Drawing Sheets

U.S. PATENT DOCUMENTS

| | | | |
|---|---|---|---|
| 4,494,432 A | 1/1985 | Kogane | |
| 4,555,966 A | 12/1985 | Klingel | |
| 4,574,669 A | 3/1986 | Vercillo et al. | |
| 4,587,830 A | 5/1986 | Mills | |
| 4,607,993 A | 8/1986 | Scharer | |
| 4,656,907 A | 4/1987 | Hymmen | |
| 4,688,456 A | 8/1987 | Stursberg | |
| 4,724,734 A | 2/1988 | Hse | |
| D296,115 S | 6/1988 | Scharer | |
| 4,763,460 A | * 8/1988 | Higo et al. | 53/381.2 |
| 4,898,055 A | 2/1990 | Neilsen | |
| 4,907,481 A | 3/1990 | Dvorak et al. | |
| 5,027,683 A | 7/1991 | Kakimoto | |
| 5,090,859 A | 2/1992 | Nanos et al. | |
| 5,096,108 A | 3/1992 | Kuze | |
| 5,143,502 A | 9/1992 | Kaufmann et al. | |
| 5,163,350 A | 11/1992 | Groswith, III et al. | |
| 5,183,361 A | 2/1993 | Ho | |
| 5,211,522 A | 5/1993 | Ho | |
| 5,291,813 A | 3/1994 | Blumenthal et al. | |
| 5,386,638 A | 2/1995 | Weber | |
| 5,429,573 A | 7/1995 | Jahnke et al. | |
| D369,729 S | 5/1996 | Herbst et al. | |
| D369,730 S | 5/1996 | Herbst et al. | |
| 5,517,888 A | 5/1996 | Ray | |
| D370,607 S | 6/1996 | Herbst et al. | |
| D371,495 S | 7/1996 | Herbst et al. | |
| D371,496 S | 7/1996 | Herbst et al. | |
| D372,737 S | 8/1996 | Herbst et al. | |
| D373,058 S | 8/1996 | Herbst et al. | |
| D373,793 S | 9/1996 | Herbst et al. | |
| D374,385 S | 10/1996 | Herbst et al. | |
| 5,771,768 A | 6/1998 | Malmstrom | |
| 5,785,479 A | 7/1998 | Battisti et al. | |
| 5,829,334 A | 11/1998 | Evans et al. | |
| 5,884,546 A | 3/1999 | Johnson | |
| 6,047,623 A | * 4/2000 | Whiteman et al. | 83/618 |
| 6,119,555 A | 9/2000 | DiMaria | |
| 6,363,826 B1 | 4/2002 | Whiteman et al. | |
| 6,408,728 B1 | * 6/2002 | Tsuji et al. | 83/687 |
| 6,536,321 B2 | * 3/2003 | Whiteman et al. | 83/698.31 |
| 2002/0069742 A1 | 6/2002 | Whiteman et al. | |
| 2002/0083814 A1 | 7/2002 | Whiteman et al. | |
| 2002/0083815 A1 | 7/2002 | Whiteman et al. | |

* cited by examiner

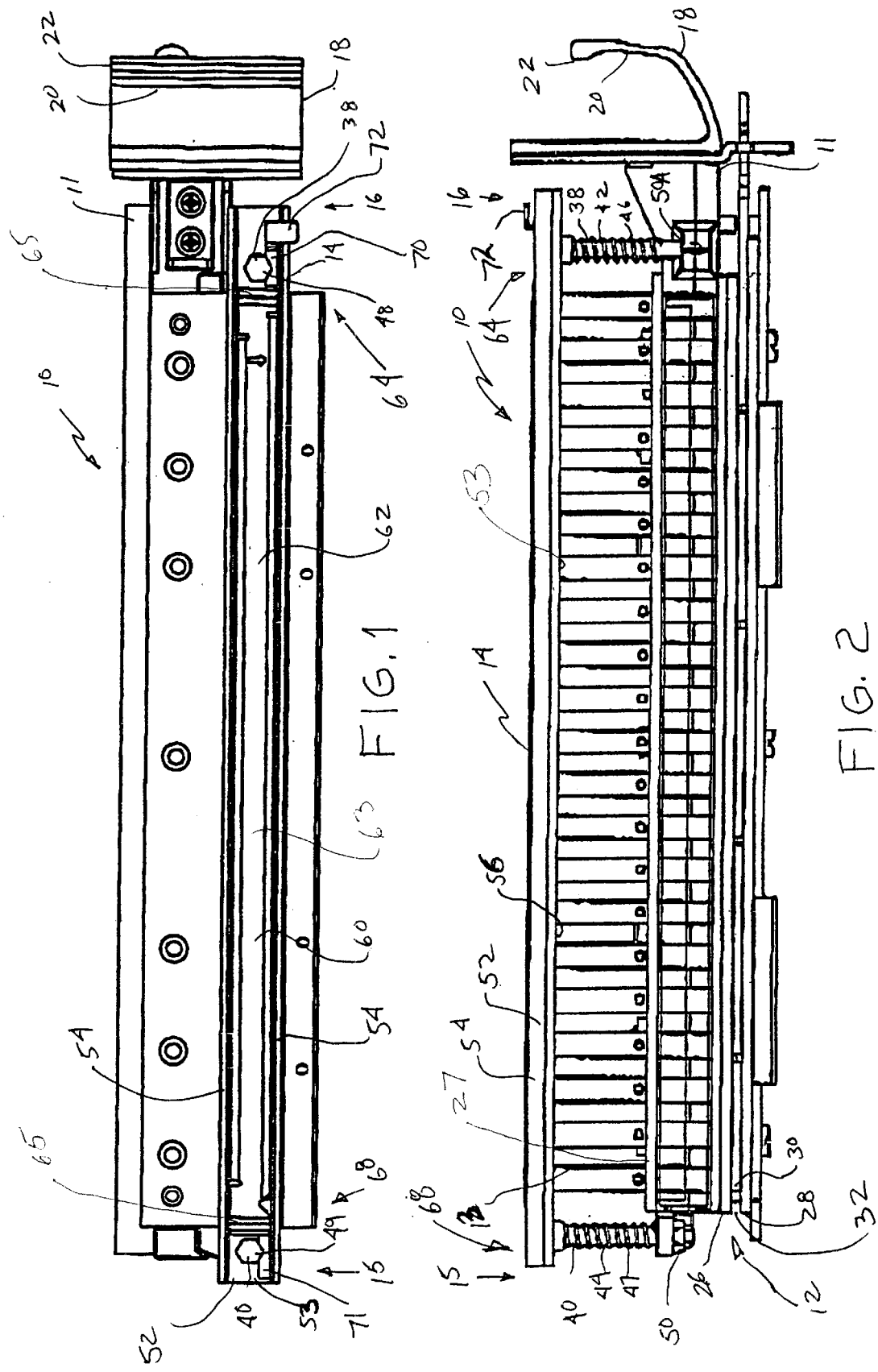

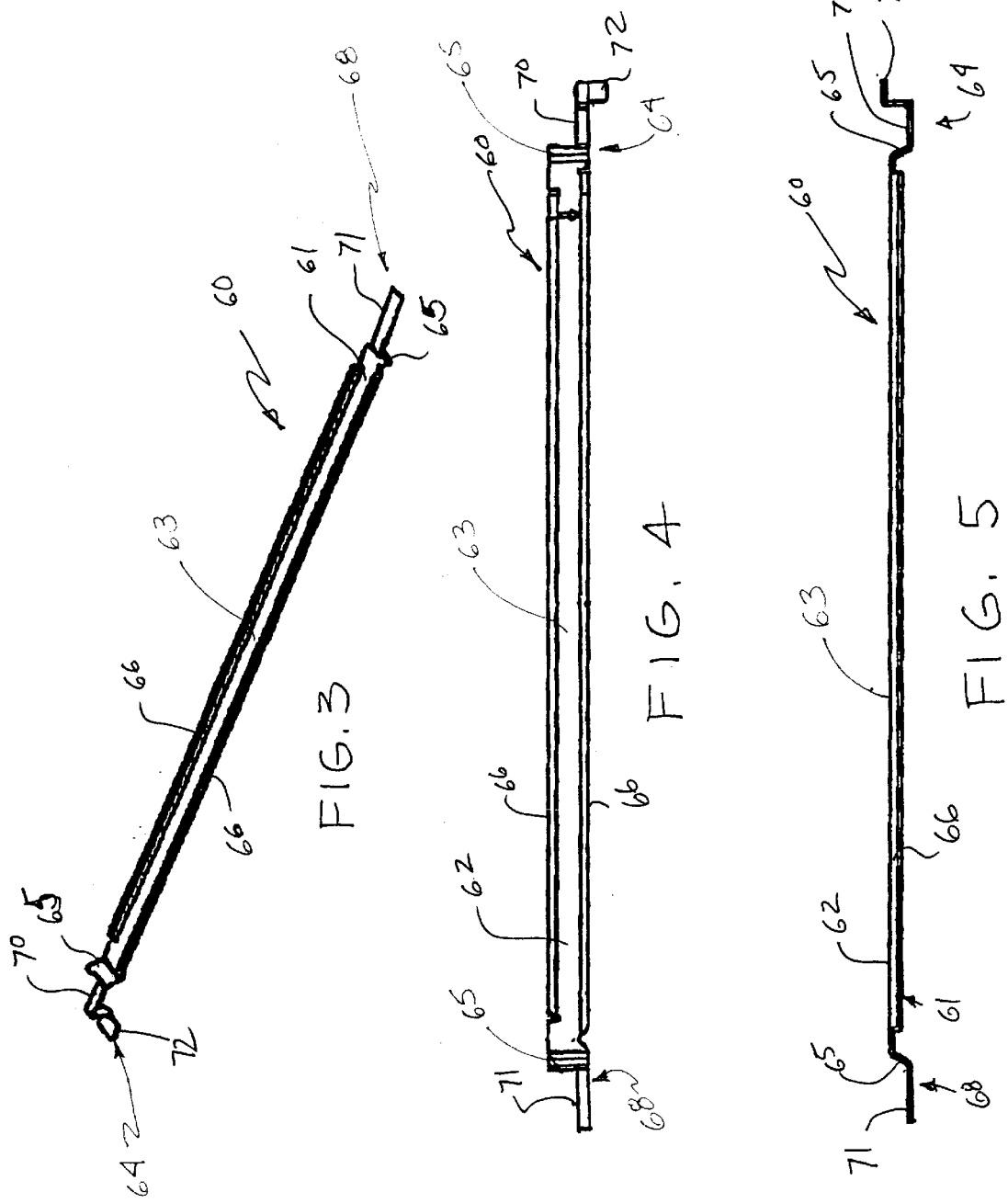

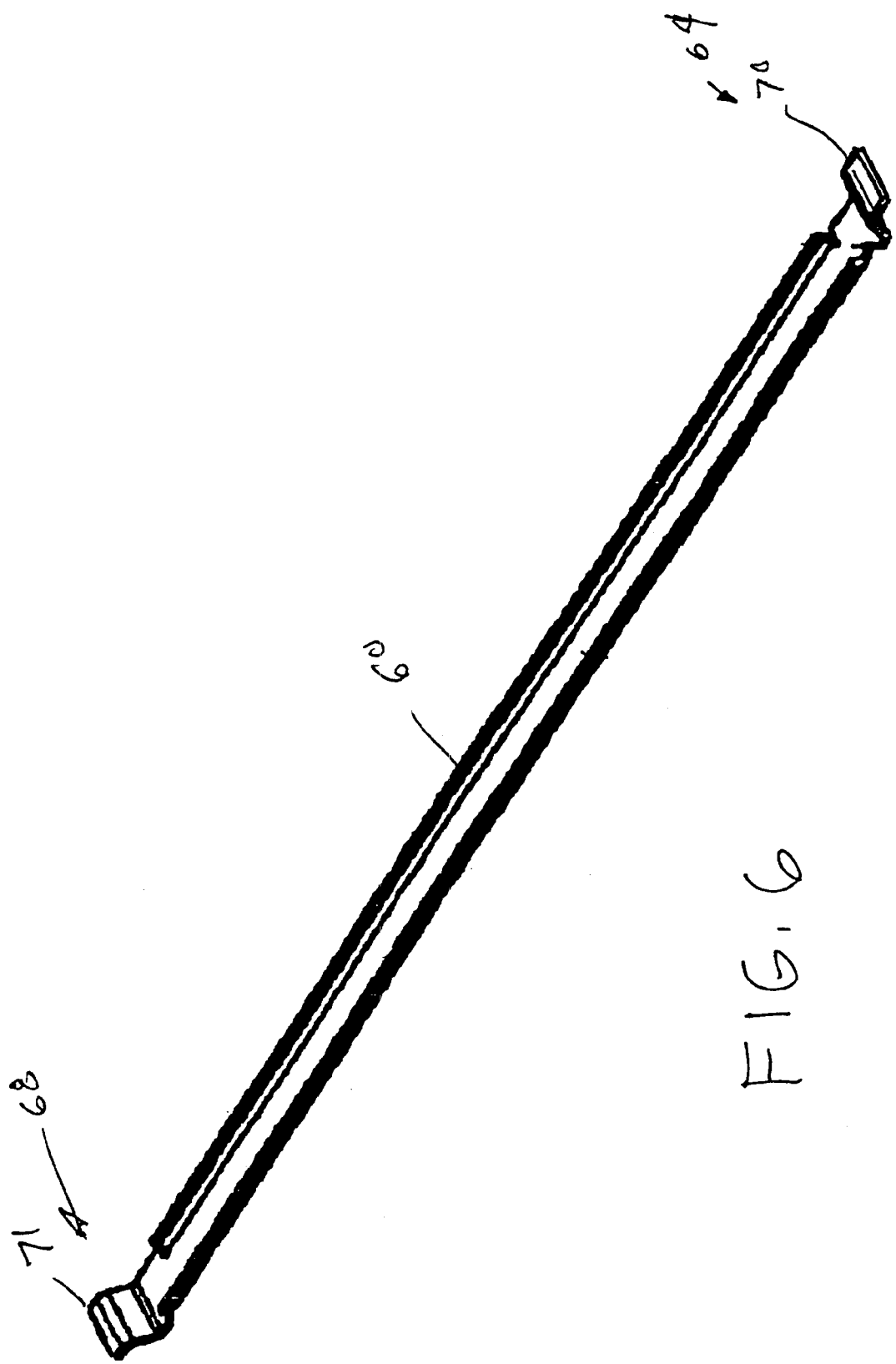

DIE SET PIN RETAINER

This application claims the benefit of Provisional application No. 60/300,631 filed Jun. 25, 2001.

FIELD OF THE INVENTION

The invention generally pertains to automated die-punching machines. More specifically, the invention relates to a removable die assembly that provides access to individual die pins of an automated die-punching machine.

BACKGROUND OF THE INVENTION

Automatic die-punching machines with die pins are often used to punch regular, repeating patterns of holes through stacks of paper sheets in preparation for binding. Typically, such a machine receives a stack of sheets and actuates to advance die pins toward the stack to punch the appropriate holes through each sheet in the stack substantially simultaneously. The pins are then reset to punch holes in another stack. Printing or document reproduction businesses often handle particular binding jobs consisting of a large number of thick stacks. As a result, a principal advantage of automatic die-punching machines is their capacity to efficiently perform a uniform, repetitive, high speed punching operation, potentially requiring a high punching force, on a collection of stacks that is fed into the machine.

Although automatic die-punching machines offer improvements over manual punching processes, regular die maintenance or changing the machine's punching parameters for particular punching jobs can be a time-consuming process requiring disassembly of the machine. For example, the size or arrangement of holes, and the number of sheets per stack vary widely between punching jobs, requiring particular configurations of die pins. Further, the service life of die pins varies inversely with frequency of their use. As a result, frequent modification of the punching parameters or regular die pin maintenance requires stopping the machine for disassembly, thus decreasing efficiency of the machine.

Mitigation of these difficulties has been attempted. For example, U.S. Pat. No. 6,047,623 ("the '623 patent") to Whiteman, et al, describes an "improved die assembly and mounting means, allowing the die assembly to be quickly installed and removed without bolts, screws, or housing panel removal." According to the disclosure, "the die assembly need not be bolted to the machine frame . . . and may be quickly removed simply by being unclamped . . . and slid out of the machine housing." This construction of such devices allows quick and easy maintenance and changeover of the die pins, although it is subject to a number of particular shortcomings.

In the '623 patent, the die pins are positioned in holes with the pin heads disposed in an elongated recess in a pin retainer plate. A relatively thin pin strap positioned over the pin heads is pivotally connected to a bolt at one end. A slot at the other end of pin strap releasably engages a bolt to keep pin strap in contact with the pin heads. The '623 patent die assembly employs a C-shaped stop member secured to the die to prevent disengagement of the pin retainer, pins, and pin strap from the die. Since the pin strap is rotatably attached to a bolt at one end, and slidably engages another bolt at a second end, the pin strap disclosed in the '623 patent is retained in position only by friction. The resulting disadvantage is that the pin strap can slip off inadvertently during removal, disassembly, maintenance, or storage of the die assembly, thus allowing the pins to become disengaged. The commercial embodiment of the '623 patent die assembly further includes a hook extending in a perpendicular plane at the end of the slot. The hook extends over the edge of the pin retainer plate in an attempt to prevent the strap slot from becoming disengaged.

In a similar design by a German manufacturer, Renz, the pin retainer strap is secured to the pin retainer plate by bolts extending through openings in either end of the strap. To access the pins, one or both of the bolts are removed.

OBJECTS AND BRIEF SUMMARY OF THE INVENTION

It is a primary object of this invention to provide a device that facilitates quick and easy removal and replacement of a die assembly with die pins in an automated die-punching machine.

It is a further object of this invention to provide a die assembly that secures die pins within a die assembly and prevents their inadvertent release or separation from the assembly.

Another object of the invention is to provide a die assembly that reduces the number of components needed to prevent inadvertent exit or removal of the die pins from the die and eliminates the need for extraneous tools.

The present invention is thus directed to a particular die pin retaining arrangement in a die assembly for use with a die punching machine for punching holes in paper stacks, wherein the die assembly facilitates quick and easy removal and replacement of the die assembly and individual die pins therein.

The invention provides a die assembly that easily slides into and out of a die punching machine, permitting an operator to install or remove it without tools. The die assembly includes a frame member, a die subassembly, die pins, and a die pin retainer subassembly. The frame member typically extends longitudinally along the length of the die assembly. A handle is affixed to the frame member to facilitate user handling of the die assembly. The handle extends outside of the die punching machine when the die assembly is installed and affords a person a designated gripping area for removing, installing, and handling the die assembly.

The die subassembly of any appropriate design is also coupled to the frame member. The die subassembly includes two substantially parallel die plates separated by a shim, thus forming a slot or die throat. Inasmuch as the stack of papers to be punched is inserted between the plates, the width of the shim determines the size of the paper stack that is receivable by the die assembly. When the stack is to be punched, the die pins are forced to slide through holes in one of the plates of the die subassembly until they impinge on the stack. The pins are further driven through the stack and through holes in the other plate of the die subassembly, thus punching holes in the stack. After the holes are punched, the pins are forced back out of the paper stack by springs or other biasing mechanism and the process is repeated on the next stack.

To transmit the punching force to the pins and to facilitate their quick and easy maintenance, the pins are retained in the die pin retainer subassembly, which is forced toward the die typically by the ram of a punching machine. The subassembly includes a die pin retainer which has holes that slidably receive the pins such that the retainer is disposed between the pin head and the die. The subassembly also includes a retaining bar, which is disposed over the pin heads to maintain the pins in the retainer. The retaining bar typically receives the punching force from the ram or punch driver in the punching machine. Since it covers and contacts each of the pin heads, the retaining bar provides for the even distribution of the punching force simultaneously to each of the pins along the length of the bar.

The retainer is preferably affixed to the frame member by one or more locking bolts or the like. In the preferred embodiment, each of the bolts has a substantially smooth shaft that allows the retainer to slide toward the die as the pins are driven into the die. Springs are disposed along the bolts between the retainer and the die to constantly bias the retainer away from the die so that one or more sheets may be received in the die throat for punching. Since the holes in the retainer are smaller in diameter than the die pin heads, the spring force that biases the retainer from the die also causes the die pins to disengage from a previously punched stack. The locking bolt heads physically stop the retainer from disengaging the bolts as a result of the spring force. Accordingly, the bolt lengths are tailored such that the bolt heads limit the retainer before the pins emerge completely from the die, eliminating the need for a separate stop member.

According to an important feature of the invention, the die pin retainer and the retaining plate of the retainer subassembly nest or engage one another to prevent relative lateral movement. Preferably, both are generally channel-shaped. In operation, the downwardly extending legs of the retaining bar are preferably disposed inboard the upwardly extending legs of the channel-shaped retainer to secure the retaining bar over the die pin heads and virtually prevent any relative lateral movement of the retaining bar within the channel-shaped retainer. In this way, the retaining bar extends along the length of the channel-shaped retainer, covering the tops of the pin heads, thus preventing them from sliding out of the channel-shaped retainer.

In order to further releasably lock the retaining bar so as to minimize relative vertical and longitudinal movement between the retainer and the retaining bar, the components include engaging structures that may be engaged to minimize relative movement, or disengaged to allow the locking bar to be moved from its position covering the pin heads. In the preferred embodiment of the invention, the ends of the retaining bar include protrusions that may be disposed subjacent a segment of the head of the locking bolt. In this way, while the nesting of the channel structures of the retainer and the retaining bar prevent lateral relative movement of the retaining bar and the retainer, the locking protrusions further minimize longitudinal and vertical movement when engaged. The protrusions may also include one or more tabs that act as handling structures to facilitate locking and unlocking of the retaining bar.

The design of the die assembly of the present invention is thus an improvement over the prior art. These and other advantages of the present invention, as well as additional inventive features, will be apparent from the description of the invention provided herein.

BRIEF DESCRIPTION OF TILE DRAWINGS

FIG. 1 is a plan view of an exemplary embodiment of a die assembly constructed in accordance with teachings of the invention.

FIG. 2 is a side elevational view of the die assembly of FIG. 1.

FIG. 3 is a perspective view of the under side of the retaining bar shown in FIGS. 1 and 2.

FIGS. 4 and 5 are plan and side elevational views of the retaining bar of FIG. 3.

FIG. 6 is a perspective view of a second embodiment of a retaining bar constructed in accordance with teachings of the invention.

DETAILED DESCRIPTION OF THE INVENTION

Figure 7:
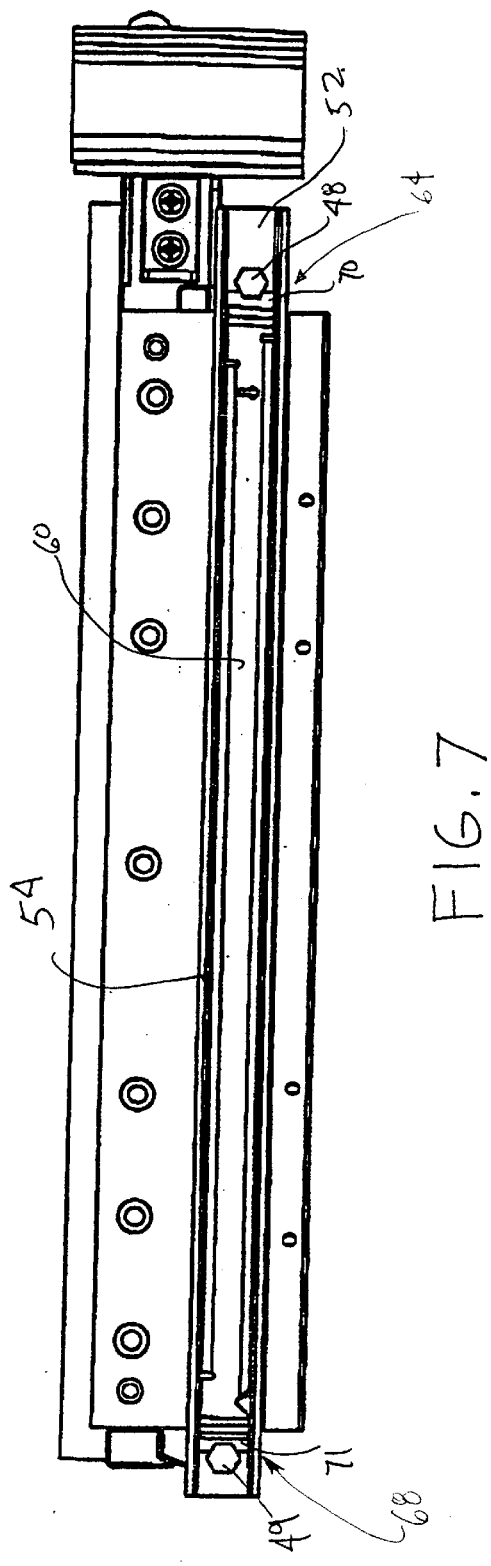
FIG. 7 is a plan view of a second embodiment of a die assembly constructed in accordance with teachings of the invention including the retaining bar of FIG. 6.

Turning now to the drawings, FIGS. 1 and 2 illustrate plan and side elevational views of a die assembly 10 constructed according to an exemplary embodiment of the invention. The die assembly 10 includes a frame member 11, which supports a die subassembly 12, die pins 13, and a die pin retainer subassembly 14. When the die assembly 10 is inserted into a die punching machine (not shown), the machine applies a punching force to the die pins 13 via the die pin retainer subassembly 14, so as to advance the die pins 13 toward and into one or more sheets fed into the die punching machine to punch the sheet(s). While the die punching machine is not shown in detail, those of skill in the art will be familiar with such machines, which are well known in the industry. The die assembly 10 is configured to be removable from the punching machine without tools, thus facilitating maintenance and quick changeover of die assemblies 10 and die pins 13 in a punching machine.

The frame member 11 of the die assembly 10 defines substantially the entire length of the die assembly 10, and has an insertion end 15, which leads the die assembly 10 into the punching machine during insertion, and a removal end 16 with a handle 18. According to the exemplary embodiment of the invention, the handle 18 is curved to provide a gripping surface 20, which terminates at a ledge 22, preferably configured to provide a secure finger hold on the handle 18. By gripping the handle 18, a person can manipulate, carry, or move the entire die assembly 10 into and out of the die machine.

In order to receive and orient a stack of sheets for punching, the frame member 11 supports a die subassembly 12. The die subassembly 12 of the exemplary embodiment (best seen in FIG. 2) includes an upper plate 26 and a lower plate 28, separated by a shim 30, thus forming a slot 32 between the plates 26, 28. Each plate 26, 28, also includes a row of die pin holes (not visible in the drawings), respectively, that receive corresponding die pins 13 supported by the die pin retainer subassembly 14. The die subassembly 12 may also include one or more upper alignment plates 27 that likewise include openings for receiving the die pins 13. The size of each die pin hole or plate opening is sufficiently large to allow the passage of the die pin 13. In the exemplary embodiment, the die pins 13 are in constant sliding engagement with the holes in the upper plate 26 as well as the openings in the upper alignment plate 27. In this way, the upper die plate 26 and the upper alignment plate 27 support the die pins 13 to maintain alignment of the die pins 13 normal to the plates 26, 28. When a punching force is applied to the die pin retainer subassembly 14, by the punching machine, the die pins 13 slide through the holes, toward a stack of sheets. The force drives the pins 13 through the sheets, and into the corresponding precision openings in the lower plate 28. Once the stack of sheets is punched, the pins 13 retract, sliding back out of the holes in the lower plate 28 and the stack, the pins 13 stopping before separating from the holes in the upper plate 26.

In order to allow relative movement between the die pins 13 and the die plates 26, 28 and provide the punching motion, the die pin retainer subassembly 14 is slidingly affixed to the frame member 11 by bolts 38, 40. Each bolt 38, 40 includes a shaft 42, 44, and a head 48, 49 of a greater diameter than its respective bolt shaft 42, 44. In this embodiment, openings in either end of the die pin retainer subassembly 14 receive the shafts 42, 44 such that the bolts 38, 40 slidingly couple the die pin retainer subassembly 14 to the frame 11 and according the die subassembly 12. To bias the die pin retainer subassembly 14 away from the die subassembly 12, a spring 46, 47 is provided along each shaft 42, 44. The springs 46, 47 thus force the die pin retainer subassembly 14 against the bolt heads 48, 49, and, accordingly, bias the die pins 13 out of engagement with the sheets and the lower die plate 28 when the punching force is not being applied by the punching machine to the die pin retainer subassembly 14.

It will be appreciated that the bolts or coupling may be arranged in any appropriate manner that facilitates the relative sliding movement between the pin retainer subassembly 14 and the frame member 11. For example, the bolts 38, 40 may slidingly engage the frame member 11 and be secured thereto by a nut 50, or the bolts 38, 40 may be fixedly threaded directly into the frame member 11 (as shown generally at 50A in FIG. 2), or alternately slidingly engaged and fixed. By further way of example, the relative sliding may be accomplished by one or more shafts secured to either the pin retainer subassembly 14 or the frame member and may be received in a bore in the other such structure. In this arrangement, an outside bracket may be required. In the illustrated embodiment, however, the bolt heads 48, 49 advantageously eliminate the need for an additional stop member, which would potentially require tight tolerance control because it must allow the pins to clear the freshly punched stack and keep them from emerging from the upper die plate 26.

The die pins 13 are held in spaced relation in the die pin retainer 52. The die pin retainer subassembly 14 includes the retainer 52, which receives the die pins 13 in die pin holes 56, spaced along the length of the base 53 of the retainer 52, the diameter of the die pin holes 56 corresponds to the diameter of the die pins 13. It will be appreciated by those of skill in the art that the die pins 13 are maintained in perpendicular relationship relative to the retainer 52 by virtue of the die in 13 extending through the retainer die pin holes 56 and the holes in the upper alignment plate 27 and the upper die plate 26.

According to the exemplary embodiment, the die pins 13 include a head portion which prevents the pin from moving freely through the hole (not visible in FIGS. 1 and 2). The head portion is typically in the form of an enlarged head in the case of a round pin, while square pins may include a small retainer pin inserted perpendicularly to the pin shaft. Alternately, a retainer ring may be provided around the shaft near one end. Thus, the enlarged heads may be in the form of a retaining ring, integral, or a perpendicularly disposed pin extending through the pin shaft, for example. For the purposes of this disclosure, the term "enlarged head" may include any of these types of head portions, as well as any other commonly used in the industry or that may be developed. As the springs 46, 47 force the retainer 52 away from the die subassembly 12, the retainer 52 pushes against the lower surface of the die pin heads to move the die pins 13 out of engagement with the lower plate 28 and the stack. The die pin heads also facilitate removal of the individual die pins 13 for maintenance or replacement by providing a larger object for a person's fingers to grip than the shafts of the die pins 13.

In order to transmit the punching force to the die pin heads and to secure the die pins 13 within the retainer 52, the die pin retainer subassembly 14 also includes a die pin retaining bar 60 (see also FIGS. 3–5). The inside surface 61 of the retaining bar 60 is disposed against the die pin heads, while its outer surface 62 typically receives the punching force from the punching machine which is transmitted to the pin heads during a punching operation.

In accordance with the invention, the surfaces of the retainer 52 and the retaining bar 60 interlock to maintain their respective lateral positions. This interlock is preferably achieved by the structures of retainer 52 and the retaining bar 60 both being in the form of an elongated channel, or one of the structures being in the form of an elongated channel and the other in the form of a plate or the like which nests between the legs of the mating elongated channel. In the currently preferred embodiment, the retainer 52 is in the form of a channel having two legs 54 extending upwardly from the base 53 (see FIGS. 1 and 2). Similarly, the retaining bar 60 preferably has an inverted channel shape including a base 63 with two downwardly extending legs 66. According to the exemplary embodiment, the legs 66 of the retaining bar 60 are spaced to fit inside the retaining channel legs 54. It will be appreciated, however, that the retaining bar legs 66 may be spaced to fit outside of the retaining channel legs 54. In either case, the legs 54, 66 of the retaining bar 60 and retainer 52, respectively, with the smaller dimension between them will "nest" within the legs of the component with the larger dimension between them, thus preventing inadvertent lateral movement of the retaining bar 60 relative to the retainer 52, which would uncover the die pins 13. In this way, the retaining bar 60 is locked in position on the retainer 52 until such time as retainer 52 is depressed so that the retaining bar 60 may be separated vertically from the retainer 52 a distance sufficient for the respective legs 66, 54 to clear, allowing access to the pins 13.

It is further contemplated that in embodiments where the heads of the pins 13 extend sufficiently into the channel of the retainer 52 the legs of the respective retainer 52 and retaining bar 60 may be arranged and sized such that the legs are staggered. In this way at least one of the legs 66 of the retaining bar 60 would be captured between the heads of the die pins 13 and one of the legs 54 of the retainer 52 to prevent or minimize lateral movement.

Alternately, either the retaining bar 60 or the retainer 52 may be in the form of a channel, and the other in the form of a plate or the like, sized to nest within the legs of the channel. For example, retaining bar 60 may be in the form of a channel, and the retainer 52 may have a relatively planar structure (not illustrated), without channel legs. In this embodiment, the legs 66 of the retaining bar 60 would be spaced sufficiently wide to accommodate the entire width of the retainer 52 and thus provide a nesting relationship. Conversely, the retaining bar 60 may be in the form of a plate, sized to be nested and retained between the legs 54 of channel-shaped retainer 52 (not illustrated).

In addition to limiting the lateral movement of the retaining bar 60 relative to the retainer 52, it is desirable to limit the relative longitudinal and vertical movement of the components 52, 60. This limitation may be accomplished by a separate structure or the same structure. For example, in the exemplary embodiment, the heads of the pins 13 protrude above the surface of the base 53 of the retainer 52. Accordingly, as may best be seen in FIG. 5, each end 64, 68 of the retaining bar 60 may also include "goosenecks" 65. The "goosenecks" 65 allow the retaining bar 60 to be disposed along the die pin heads with retaining bar ends 64, 68 angling downward to the upper surface of the retainer 52. The angled "goosenecks" 65 in effect, form a channel over the pin heads 50, minimizing movement of the retaining bar 60 in the longitudinal direction relative to the retainer 52. In this way the relative lateral and longitudinal positions of the retaining bar 60 and the retainer 52 may be maintained merely by the relative sizing and structure of the bar 60 and retainer 52.

It will be appreciated, however, that alternate or additional limiting structure maybe provided. For example, protrusions from the upper surface of the retainer 52 may be provided outboard the "goosenecks" 65 or the ends 64, 68 of the retaining bar 60, further preventing longitudinal relative movement. In the embodiment shown in FIGS. 1–5, for example, the couplings are in the form of the heads 48, 49 of the bolts 38, 40, and surfaces of the retaining bar 60, which are sized and disposed to be positioned below the heads 48, 49 of the bolts 38, 40. The engaging surfaces of the retaining bar 60 may be merely an extended surface, or protrusions 70, 71, such as those illustrated in FIGS. 3–5. In the embodiment illustrated in FIGS. 1–5, the protrusions 70, 71 extend parallel to the longitudinal axis of the retainer 52. The width of the protrusions 70, 71 is less than the width of the retaining bar 60, such that the locking protrusions 70, 71 can engage side of the bolts 38, 40 between the bolt head 48, 49 and a leg 54 of the retainer 52 when the retaining bar 60 is substantially aligned with the retainer 52 over the die pin heads, as shown in FIG. 1. In this way, the protrusions 70, 71 are disposed between the bolt shafts 42, 44 and one of the retainer legs 54 and between the bolt heads 48, 49 and the upper surface of the retainer 52 (along the upper and lower surfaces, respectively), of the protrusions 70, 71. It will be appreciated by those of skill in the art, however, that the retainer legs 54 need not extend along the complete length of the retainer 52 in order to retain the protrusions 70, 71 laterally between the bolt shafts 42, 44 and a plane containing the retainer legs 54 so long as the outside lateral edge of the retaining bar 60 is laterally retained in the plane comprising the retainer leg 54.

While the protrusions 70, 71 have been described as extending parallel to the elongated axis of the retaining bar 60, it will be appreciated that the protrusions 70, 71 may have an alternate design and be disposed at positions other than the position illustrated. For example, the protrusions 70, 71 might be disposed perpendicularly to the axis of the retaining bar 60, as shown, for example, in FIGS. 6–7. In such an alternate embodiment, the retaining bar 60 is simply cut at its ends 64, 68 at a length which allows the retaining bar 60 to be disposed beneath the bolt heads 48, 49, as shown in FIG. 7. In this way, the retaining bar protrusions 70, 71 would similarly define a segment of the bolt head 48, 49, thus securing the retaining bar 60 between the bolt head 48, 49 and the retainer 52.

In order to assist the user in manipulating the retaining bar 60 into and out of substantial alignment with the retainer 52, one or more handles in the form of tabs 72 or the like may be provided. While the illustrated embodiment includes only one tab 72, it will be appreciated that such a tab 72 may likewise be provided at the opposite end of the retaining bar 60. The tab 72 extends upwardly from the protrusion 70, as seen in FIGS. 1–5, and provides a surface which the user may grasp. In use, the retaining bar 60 is removed by pressing the retainer 52, near the retaining bar ends 64, 68, toward the die subassembly 12, to create a clearance between the ends 64, 68 and the bolt heads 48, 49. The retaining bar outer surface 62 can then be lifted off of the die pin heads by the tab 72, and moved out of alignment with the retainer 52 to afford access to the die pin heads for replacement or maintenance. Accordingly, the shape of the retainer 52 and retaining bar 60 provide a "positive lock" that prevents the die pin heads from being inadvertently exposed, and the die pins 13 from inadvertently escaping the die assembly 10.

Figure 8:
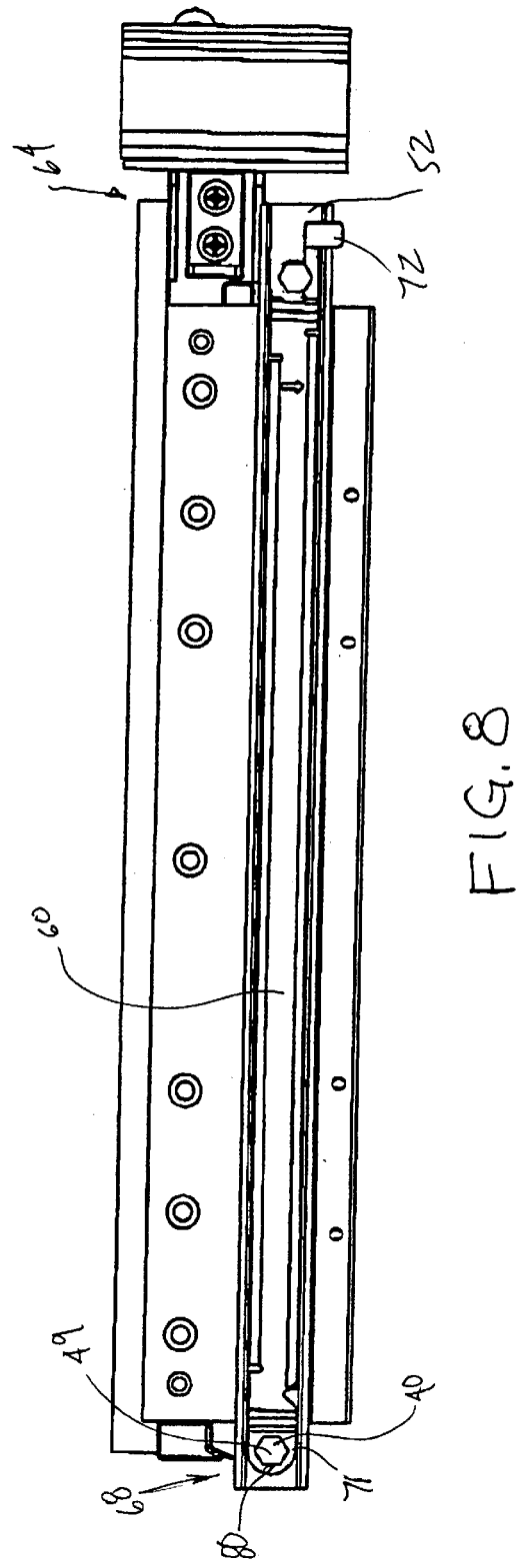
FIG. 8 is a plan view of a die assembly including third alternate embodiment of the retaining bar constructed in accordance with teachings of the invention.

In an alternative embodiment, shown in FIG. 8, the protrusion 71 at one end 68 of the retaining bar 60 may be in the form of an elongated flat surface with a bore 80 therethrough. The bore 80 receives the shaft 44 of the bolt 40 such that the protrusion 71 is disposed between the bolt head 49 and the upper surface of the retainer 52. Such an arrangement would allow the retaining bar 60 to be moved out of alignment with the retainer 52 once the user had moved the retainer 52 to allow the retaining bar 60 to be uncoupled from the retainer 52 as described above, thus exposing the pin heads without completely disengaging from the die pin retainer subassembly. The opposite end 64 from the secured end 68 may then be secured as described above with regard to the first embodiment, such that the retaining bar 60 and retainer 52 are substantially in alignment, by a locking protrusion 70, potentially including a tab 72 as described above.

In yet another embodiment, the retaining bar 60 may be provided with appropriately disposed keyhole shaped openings or the like for receiving the heads of the bolts (or other protrusion with a head). The retaining bar 60 and the retainer 52 may then be slid longitudinally relative to one another to dispose the shaft of the bolt in the smaller end of the keyhole to secure the components 52, 60 together. It will be appreciated that the protrusions may alternately extend from the retaining bar 60 and be received in openings in the retainer 52.

The protrusion may alternately have the shape of an arched or hooked segment extending from one of the components 52, 60, which is received in an opening in the other of the components 52, 60. Such an arched segment may provide a hinged relationship between the retaining bar 60 and the retainer 52. Thus, the protrusion would limit not only the longitudinal movement of the retaining bar 60 relative to the retainer 52, but it also limit the vertical movement at one end of the retaining bar 60 relative to the retainer 52.

Figure 9:
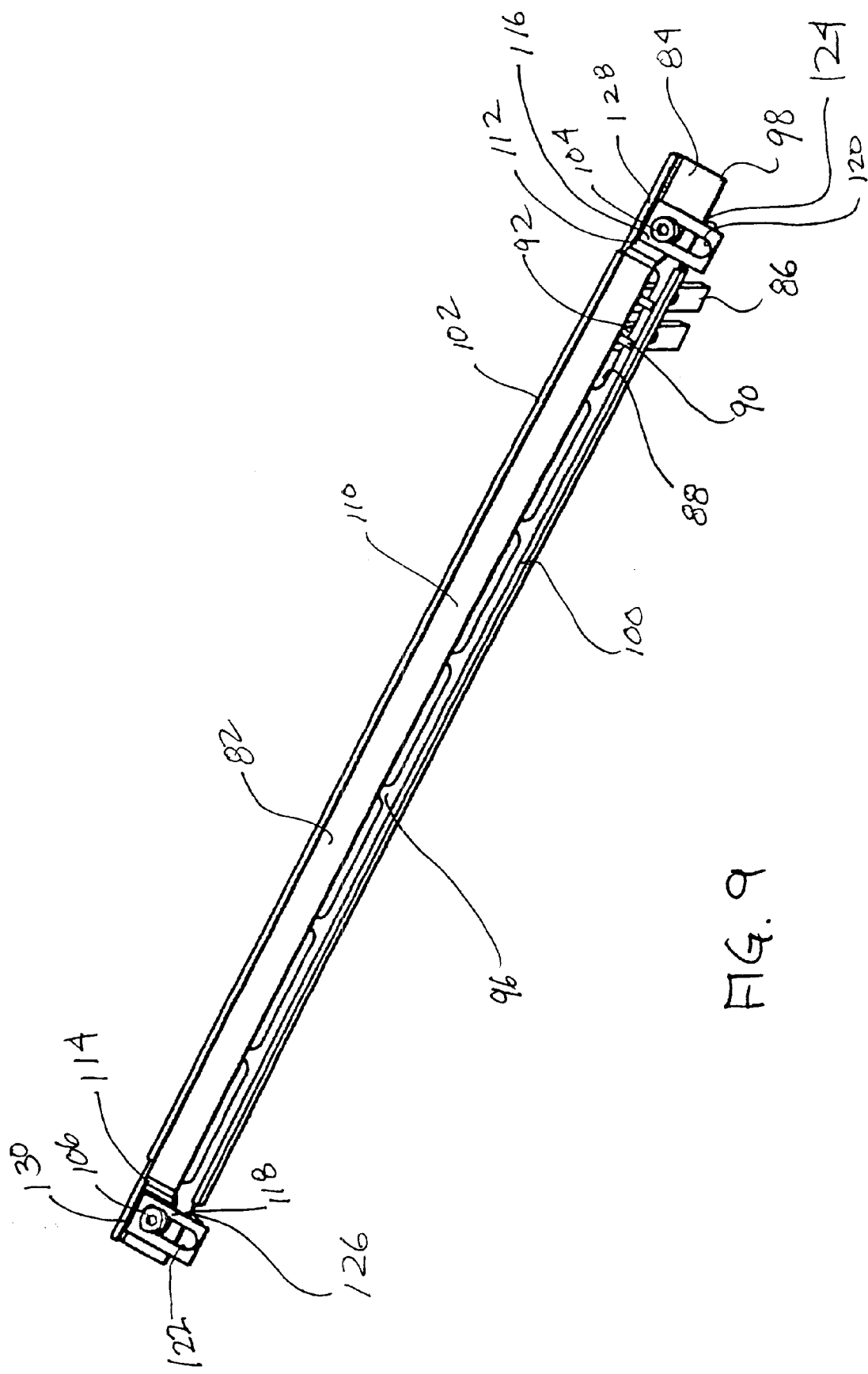
FIG. 9 is a perspective view of a fourth embodiment of a die pin retainer subassembly constructed in accordance with teachings of the invention, wherein the retaining bar is shown in the position covering the heads of the pins.
Figure 10:
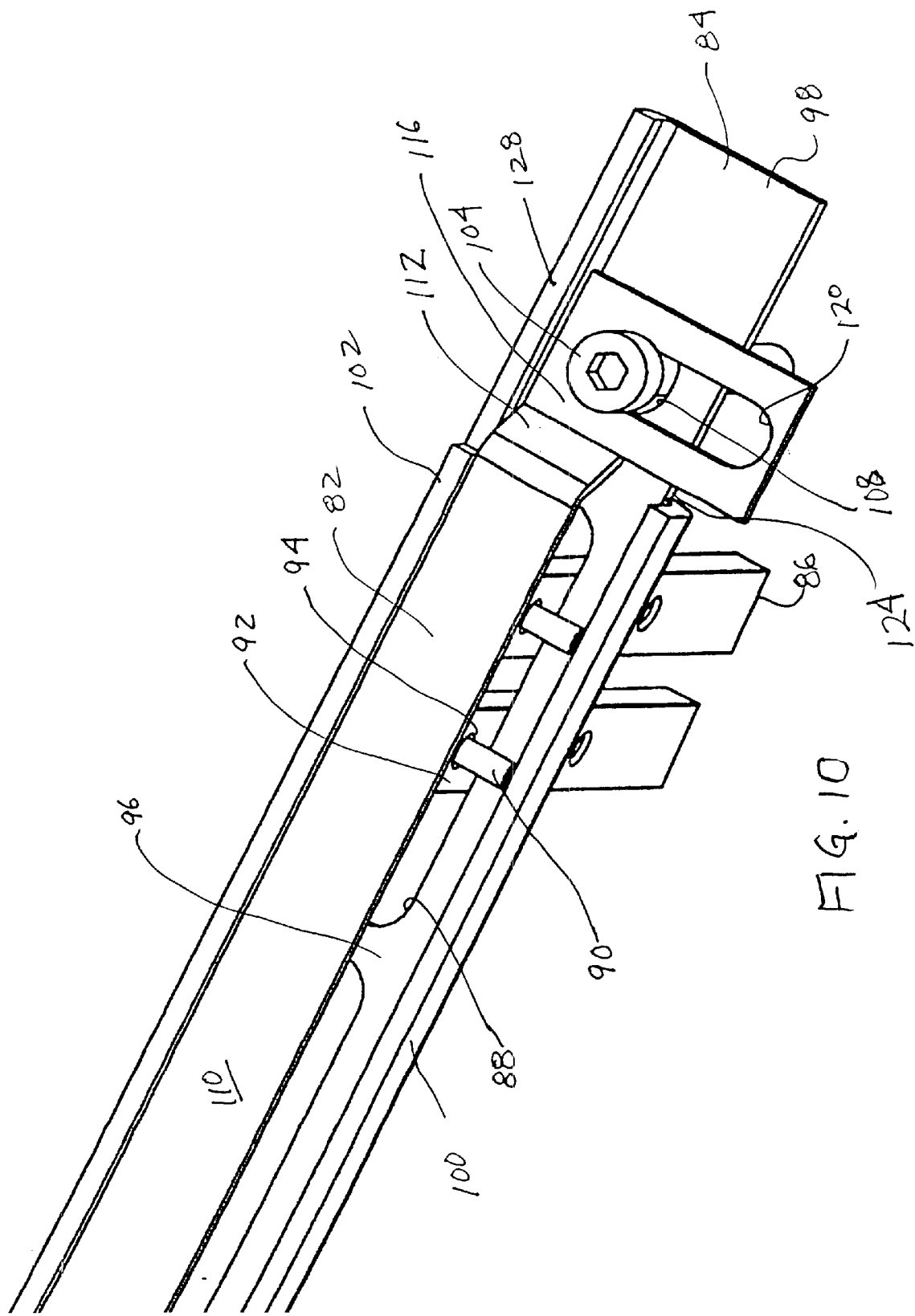
FIG. 10 is an enlarged fragmentary view of one end of the die pin retainer subassembly as shown in FIG. 9.

Yet another embodiment of the invention is shown in FIGS. 9–12. In this embodiment, the retaining bar 82 remains parallel to the retainer 84, the retaining bar 82 sliding sideways from the retainer 84. As best seen in FIGS. 9 and 10, punch pins 86 are received in an opening 88 in the retainer 84. The punch pins 86 illustrated in this embodiment are rectangular, the heads being formed by a combination of a positioning pin 90 and the upper end 92 of the pin 86. As may best be seen in the enlarged view of FIG. 10, the positioning pin 90 extends perpendicularly to the axis of the pin 86 through an opening 94 in the upper end 92 of the punch pin 86. In this way, the positioning pin 90 is disposed along the upper surface 96 of the retainer 84. The retaining bar 82 is then disposed over the upper end 92 of the punch pin 86 to retain the punch pins 86 in position in retainer 84.

In this embodiment, as best seen in FIG. 10, the retainer 84 is in the form of a channel having a base 98 and upstanding legs 100, 102. The retainer 84 further includes a pair of projections, or locking bolts 104, 106, which extend upward from the retainer 84. As with the previous embodiments, the locking bolts 104, 106 may be secured directly to the retainer 84 or they may extend through openings 108 in the retainer 84, as is the case with locking bolt 104, which allow the retainer 84 to slide in a plane substantially perpendicular to the locking bolt 104. Thus, an indication that the projection or locking bolt 104, 106 extends from the retainer 84 or a surface 96 thereof is not intended to limit the projection or locking bolt 104, 106 to being secured to the retainer 84 or the surface 96 thereof itself, but, rather, that the projection or locking bolt 104, 106 be at least coupled to the retainer 84.

The retaining bar 82 includes an elongated, substantially planar, central portion 110 with gooseneck offsets 112, 114 to protrusions 116, 118 at either end. In order to permit the sideways sliding relative motion of the retaining bar 82 to the retainer 84, the protrusions 116, 118 are elongated in a direction substantially perpendicular to the elongated central portion 110 of the retaining bar 82 and likewise contain perpendicularly extending slots 120, 122. As may best be seen in FIGS. 10 and 12, the locking bolts or projections 104, 106 extend through the slots 120, 122 such that at least a portion of the protrusions 116, 118 is disposed subjacent head of the locking bolt 104, 106.

Figure 11:
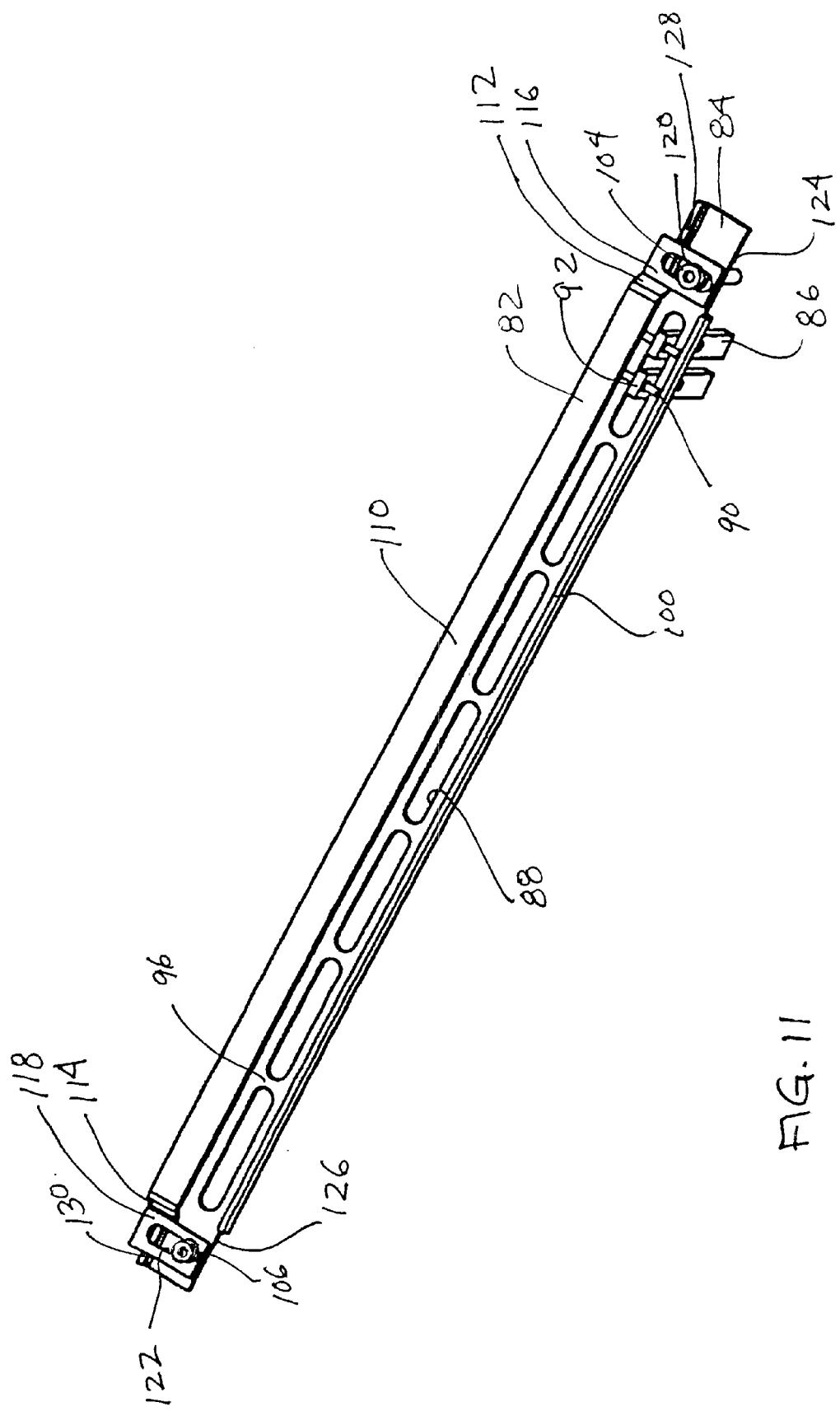
FIG. 11 is a perspective view of the die pin retainer subassembly of FIGS. 9 and 10, wherein the retaining bar is not covering the die pin heads.
Figure 12:
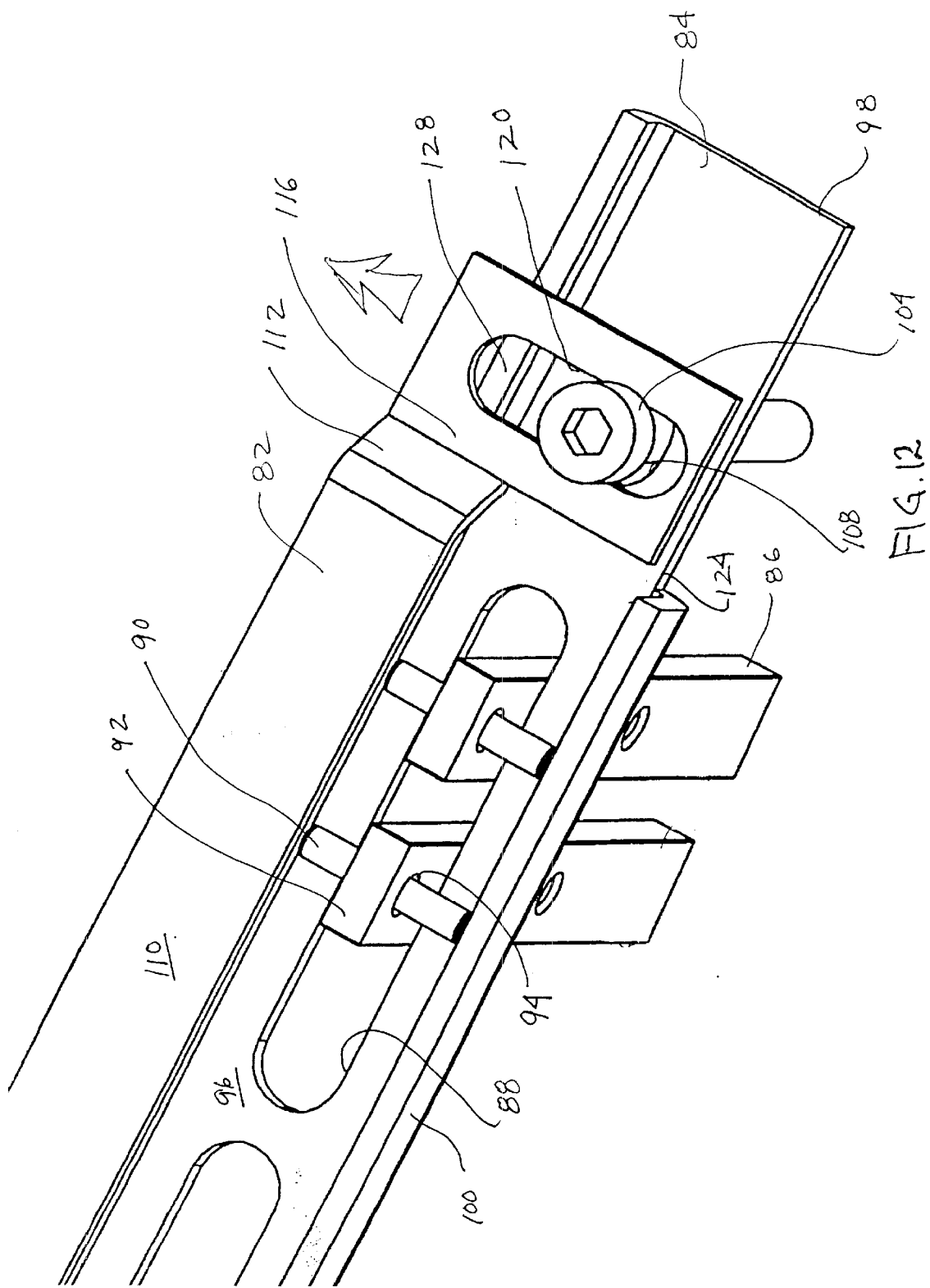
FIG. 12 is an enlarged fragmentary view of the die pin retainer subassembly as shown in FIG. 11.

To facilitate the relative sliding motion to move the retaining bar 82 between the punch pin 86 covering position, shown in FIGS. 9 and 10, to the revealed position, shown in FIGS. 11 and 12, and to accommodate the elongated protrusion 116, 118, the upstanding legs 100, 102 are adapted to accommodate the protrusions 116, 118. More particularly, in the illustrated embodiment, the upstanding leg 100 includes a cut-out section 124, 126 at either end, or, in other words, does not extend all of the way to the ends of the retainer base 98. In this way, when the retaining bar 82 is in the punch pin covering position shown in FIGS. 9 and 10, the protrusions 116, 118 lie substantially flat against the upper surface 96 of the retainer 84, the ends of the protrusions 116, 118 extending along the cut-out sections 124, 126.

Similarly, to assist in maintaining the retaining bar 82 in position along the retainer 84 as shown in FIGS. 9 and 10, while also permitting the user to slide the retaining bar 82 sideways relative to the retainer 84, the upstanding leg 102 includes a reduced height portion 128, 130. Thus, when the retaining bar 82 is in the position shown in FIGS. 9 and 10, the elongated central portion 110 of the retaining bar 82 is captured between the upstanding legs 100, 102 of the retainer 84. More particularly, the contact between the side edge of the elongated central portion 110 of the retaining bar 82 and/or the side edge of the protrusion 116 in contact with the reduced height portion 128 of leg 102, in combination with the capturing of the protrusion between the locking bolt 104 and the upper surface 96 of the retainer 84 maintains the position of the retaining bar 82 relative to the retainer 84 when the retaining bar is in position covering the punch pins 86.

In moving the retaining bar 82 to the position shown in FIGS. 11 and 12 relative to the retainer 84, the retaining bar 82 is canted slightly upward to allow the gooseneck offsets 112, 114 and the protrusions 116, 118 to slide over the reduced height portions 128, 130 of leg 102 and to allow the elongated central portion 110 of the retaining bar 82 to clear the upstanding leg 102. In this way, those of skill in the art will appreciate that the retaining bar 82 moves in a combination of the vertical and lateral directions relative to the retainer 84 in order to allow the user access to the punch pins 86. In this way, both ends of the retaining bar 82 remain directly coupled to the retainer 84.

Figure 13:
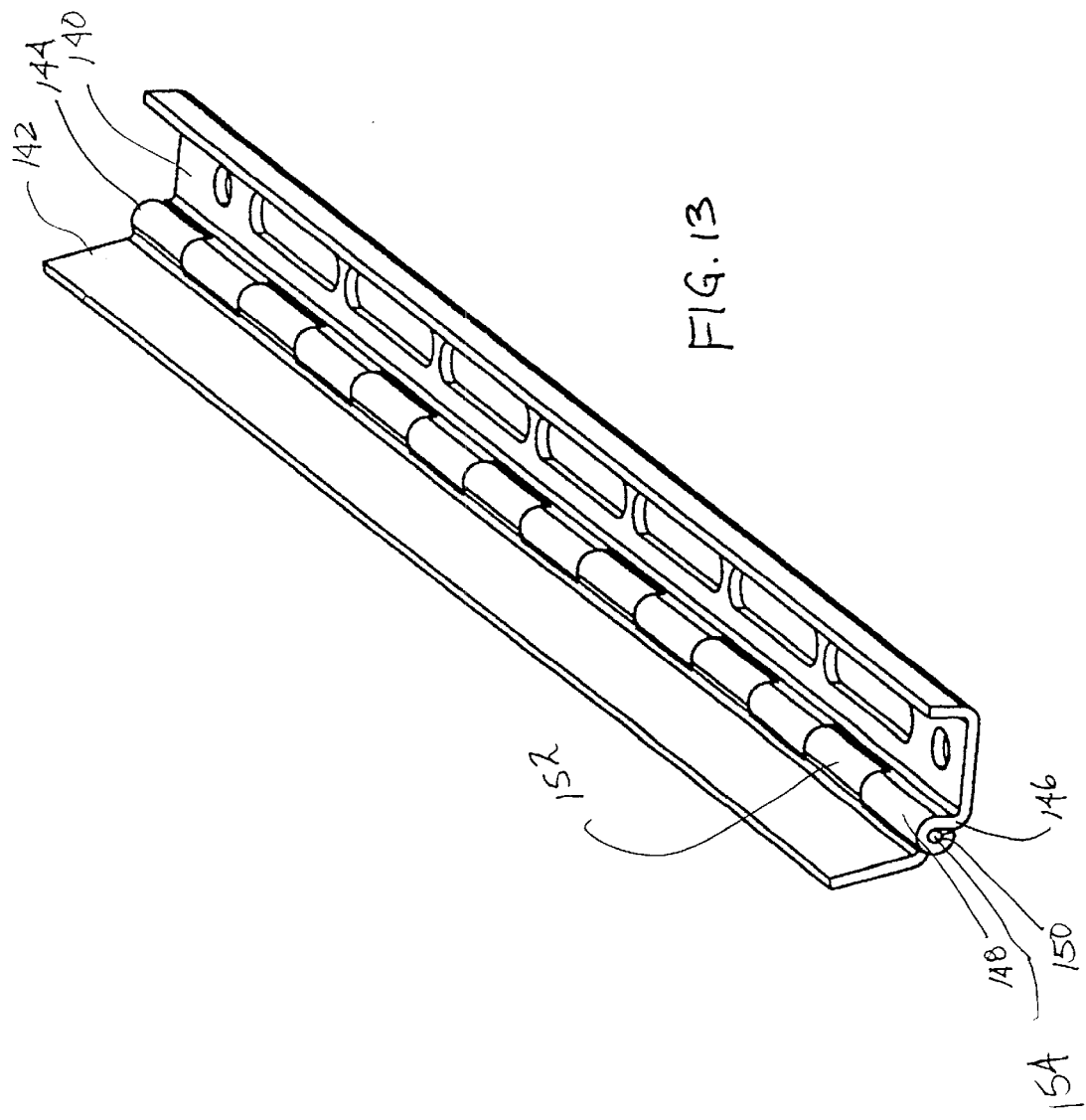
FIG. 13 is a perspective view of a fifth alternate embodiment of a die pin retainer and retaining bar constructed in accordance with teachings of the invention.

Turning now to FIG. 13, another alternate embodiment of a retainer 140 and retaining bar 142 arrangement is illustrated. In this embodiment, the retaining bar 142 is hinged along one elongated edge to the retainer 140. The hinge 144 may be formed by any appropriate means. In the illustrated embodiment, the retainer 140 is formed as a channel with one of the legs 146 including a plurality of parallel tangs 148 curled over to form a plurality of openings 150, each disposed along a single axis. An edge of the retaining bar 142 similarly includes a plurality of tangs 152 spaced for alternately disposal between the tangs 148 of the retainer 140. As with the tangs 148 of the retainer 140, the tangs 152 of the retaining bar 142 likewise curl over to form a plurality of elongated openings (not visible in the drawings) each disposed along an axis. A hinge pin 154 is then assembled into the openings 150 of the tangs 148, 152 of the retainer 140 and the retaining bar 142 to hingedly couple the components together. It will be appreciated by those of skill in the art that the retainer 140, retaining bar 142 arrangement of FIG. 13 is substantially the same as the previously described embodiments with respect to essentially all other aspects of pin retention and operation.

Figure 14:
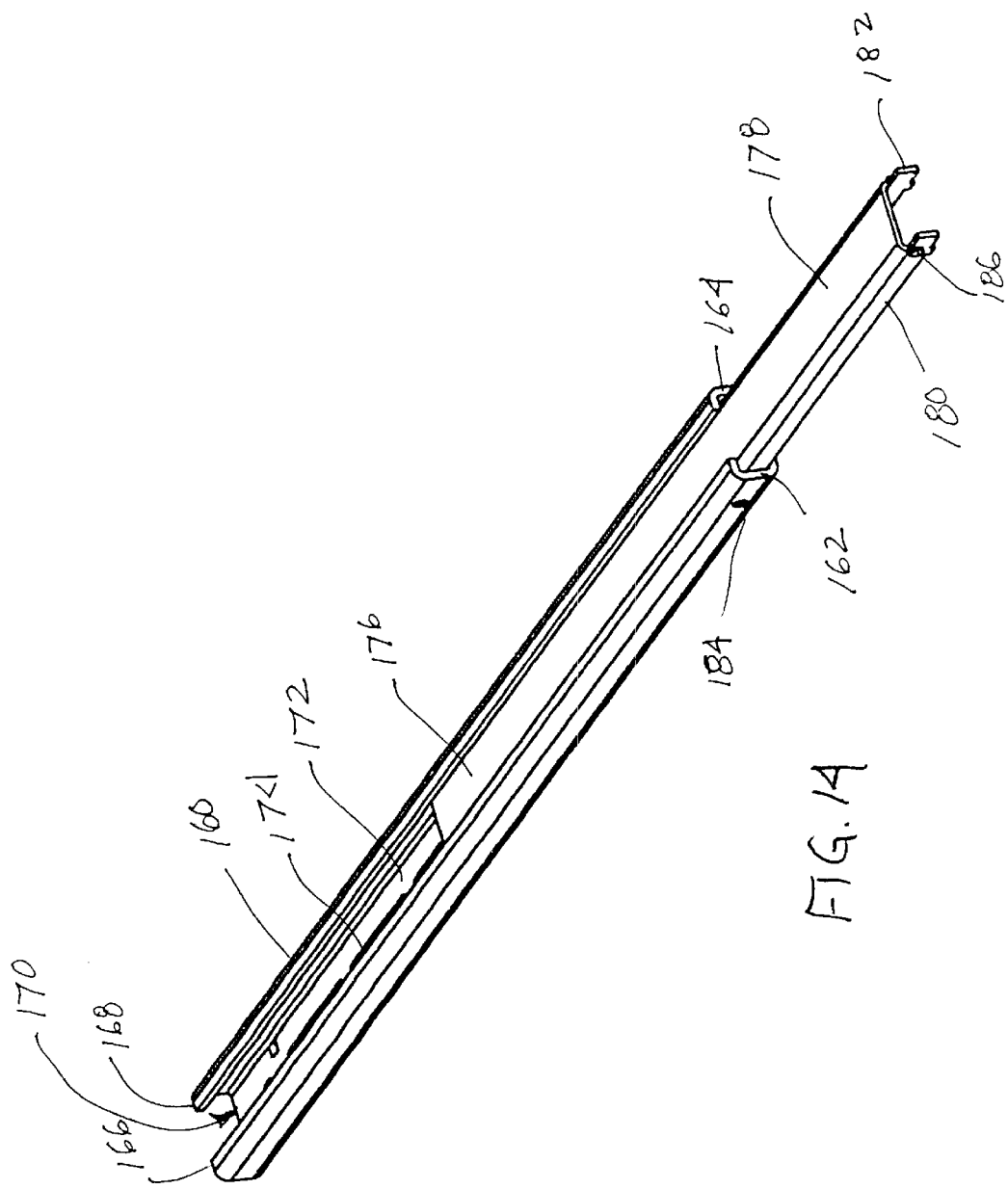
FIG. 14 is a perspective view of a sixth alternate embodiment of a die pin retainer and retaining bar constructed in accordance with teachings of the invention.

Yet another embodiment of the invention is illustrated in FIG. 14. In this embodiment, the retainer 160 includes not only upstanding legs 162, 164, flanges 166, 168 which extend inwardly from the distal ends of the upstanding legs 162, 164 to create the channel 170. As with the other embodiments, the base 172 includes one or more openings 174 for receiving one or more pins (not shown). The pins are secured in the retainer by the retaining bar 176. In assembling and disassembling the retaining bar 176 to the retainer 160, the retaining bar 176 slides into the channel 170 to be positioned atop the pin heads and subjacent the flanges 166, 168. In the illustrated embodiment, the retaining bar 176 includes a base 178 and a pair of depending legs 180, 182. It will be appreciated, however, that the retaining bar 176 could have an alternate design, such as a simple planar bar, for example, inasmuch as it would be captured in the channel 170 not only by the upstanding legs 162, 164, but also by the flanges 166, 168.

In order to further maintain the retaining bar 176 in position in the channel 170 of the retainer 160, the retaining bar 176 and/or the retainer 160 may include a retaining structure. In the illustrated embodiment, the retainer 160 includes a protrusion 184 that protrudes from one of the upstanding legs 162 into the channel 170, while the depending leg 180 of the retaining bar includes a depression 186 or an opening for receiving the protrusion 184. The locations of the protrusion 184 and depression or opening 186 could be reversed or otherwise located. Alternately, a different latch or interference arrangement may be provided if desired.

While this invention has been described with an emphasis upon various exemplary embodiments, variations of the exemplary embodiments can be used, and it is intended that the invention can be practiced otherwise than as specifically described herein. For example, although the various channels have been illustrated as including a base with a single leg on each side, such a channel could likewise be defined by a base with a plurality of legs or a broken leg along either side.

In this way, even though the description or claims may reference a leg along either side, this language is intended to, and necessarily does, include an arrangement where a plurality of legs or a broken leg is disposed along either or both sides of the base. By way of further example, while a component such as the retaining bar may be described as being captured between an upstanding leg of the retainer and a protrusion, such as a bolt, it will be appreciated that the retaining bar may be likewise captured between the bolt and a plane containing the upstanding leg. Thus, the leg might not even extend to a position proximal the bolt. Accordingly, this invention includes all modifications encompassed within the spirit and scope of the invention as defined by the following claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All of the references cited herein, including patents, patent applications, and publications, are herby incorporated in their entireties by reference.

We claim the following as our invention:

1. A die pin retainer subassembly for use in a die assembly that slidably engages with a die punching machine, said die assembly including a die subassembly adapted to receive at least one sheet for punching, said die pin retainer subassembly and said die subassembly being moveable relative to one another in a predetermined path, said die punching machine adapted to exert a force to cause relative movement between the die subassembly and the die pin retainer subassembly to cause the die assembly to close and punch said at least one sheet, said die pin retainer subassembly comprising:
   at least one die pin having an elongated pin shaft and an enlarged pin head,
   a retainer having a retainer upper surface, a retainer lower surface, and first and second retainer ends defining a longitudinal direction, the retainer including at least one die pin opening therethrough, said at least one die pin being received in said die pin opening with said enlarged head being disposed along said retainer upper surface, the retainer further defining a lateral direction substantially perpendicular to the longitudinal direction and substantially perpendicular to the elongated pin shaft, and a vertical direction substantially parallel to the elongated pin shaft,
   a retaining bar having a bar upper surface, a bar lower surface, and first and second bar ends corresponding to said first and second retainer ends, said retaining bar being disposed substantially parallel to the retainer, the enlarged pin head being disposed subjacent the lower surface of the retaining bar to maintain the pin in the die pin opening,
   at least one of the retainer or the retaining bar being in the form of a channel extending in the longitudinal direction, said retainer and said retaining bar being sized and configured to nest along the lateral direction to minimize any relative movement of the retainer and the retaining bar in the lateral direction.

2. The die pin retainer subassembly of claim 1 wherein the retaining bar is in the form of a channel extending in the longitudinal direction, the retaining bar having a base and depending legs.

3. The die pin retainer subassembly of claim 2 wherein the retainer is in the form of a channel extending in the longitudinal direction, the retainer having a base and upstanding legs, the legs of said channels nesting to minimize relative movement of the retainer and the retaining bar in the lateral direction.

4. The die pin retainer subassembly of claim 2 wherein the retainer is in the form of a plate, said plate be sized such that it nests between the depending legs of the channel to minimize relative movement in the lateral direction.

5. The die pin retainer subassembly of claim 1 wherein the retainer is in the form of a channel extending in the longitudinal direction, the retaining bar having a base and upstanding legs.

6. The die pin retainer subassembly of claim 5 wherein the retaining bar is in the form of a plate, said plate be sized such that it nests between the upstanding legs of the channel to minimize relative movement in the lateral direction.

7. The die pin retainer subassembly of claim 1 further comprising at least one projection for limiting the relative movement between the retainer and the retaining bar in at least one of the longitudinal direction or the vertical direction.

8. The die pin retainer subassembly of claim 7 wherein the at least one projection comprises a protrusion extending from at least one of the retainer upper surface or the retaining bar lower surface.

9. The die pin retainer subassembly of claim 8 wherein the other of the retainer upper surface or the bar lower surface includes at least one protrusion opening for receiving the at least one protrusion.

10. The die pin retainer subassembly of claim 9 wherein the protrusion is in the form of an arched segment and engagement of the protrusion and the protrusion opening allows the retaining bar and the retainer to hinge apart in a plane defined by the longitudinal and vertical directions.

11. The die pin retainer subassembly of claim 9 wherein said protrusion includes an elongated protrusion shaft and an enlarged protrusion head, and said protrusion opening having a keyhole shape with a large end sized for receiving the enlarged protrusion head and a small end sized for receiving the elongated protrusion shaft, said protrusion and said protrusion opening being disposed to engage and permit the retainer and the retaining bar to slide relative to one another to lock said retainer and said retaining bar together.

12. The die pin retainer subassembly of claim 8 wherein the protrusion has a shaft and an enlarged head, and the retaining bar has an arm protruding from at least said first retaining bar end, said arm adapted to be disposed between the enlarged protrusion head, and upper surface of the retainer.

13. The die pin retainer subassembly of claim 12 wherein the retainer is in the form of a channel having a base and upstanding legs, said arm extends longitudinally from said first bar end and is adapted to be disposed between said protrusion shaft and a plane containing one of said legs, said protrusion shaft and said plane containing one of said legs limiting movement of the first bar end in said lateral direction.

14. The die pin retainer subassembly of claim 13 wherein the arm extends longitudinally from said first bar end and is sized and disposed to define a segment of the enlarged protrusion head.

15. The die pin retainer subassembly of claim 12, wherein the projection further includes a tab extending from the arm.

16. The die pin retainer subassembly of claim 12 wherein the retaining bar includes arms at both the first and second bar ends, and said retainer includes protrusions at the first and second retainer ends, the arms being configured to releasably engage said protrusions to couple together the retainer and the retaining bar.

17. The die pin retainer subassembly of claim 16 wherein the retainer is in the form of a channel having a base and upstanding legs, said arms extend longitudinally from said first and second bar ends and are disposed between said protrusion shafts and a plane containing one of said upstanding legs.

18. The die pin retainer subassembly of claim 1, wherein the retaining bar includes a gooseneck offset at said first end.

19. The die pin retainer subassembly of claim 1 wherein the retainer is in the form of a channel comprising protrusions at the first and second retainer ends, and the retaining bar includes elongated openings at the first and second retaining bar ends, said elongated openings slidably receiving the protrusions whereby the retaining bar may move in the vertical and lateral directions relative to the retainer as said elongated openings slide along with said protrusions.

20. The die pin retainer subassembly of claim 7 wherein the at least one projection extends from at least one of the retainer or the retaining bar toward the other of the retainer or the retaining bar.

21. The die pin retainer subassembly of claim 1 wherein at least one of the retainer or the retaining bar includes a base, legs, and at least one flange extending from at least one of said legs.

22. The die pin retainer subassembly of claim 1 wherein the retaining bar and the retainer each include an elongated edge, the retaining bar and the retainer are hinged together along the elongated edges.

23. A die punch machine comprising
a ram mounted for linear movement, and
a die assembly, said die assembly slidably engaging with said die punch machine, said die assembly including
a die subassembly adapted to receive at least one sheet for punching, and
a die pin retainer subassembly, said die pin retainer subassembly and said die subassembly being moveable relative to one another in a predetermined path to cause the die assembly to close and punch said at least one sheet in response to movement of said ram, said die pin retainer subassembly comprising
at least one die pin having an elongated pin shaft and an enlarged pin head, a retainer having a retainer upper surface, a retainer lower surface, and first and second retainer ends defining a longitudinal direction, the retainer including at least one die pin opening therethrough, said at least one die pin being received in said die pin opening with said enlarged head being disposed along said retainer upper surface, the retainer further defining a lateral direction substantially perpendicular to the longitudinal direction and substantially perpendicular to the elongated pin shaft, and a vertical direction substantially parallel to the elongated pin shaft,
a retaining bar having a bar upper surface, a bar lower surface, and first and second bar ends corresponding to said first and second retainer ends, said retaining bar being disposed substantially parallel to the retainer, the enlarged pin head being disposed subjacent the lower surface of the retaining bar to maintain the pin in the die pin opening,
at least one of the retainer or the retaining bar being in the form of a channel extending in the longitudinal direction, said retainer and said retaining bar being sized and configured to nest along the lateral direction to minimize any relative movement of the retainer and the retaining bar in the lateral direction.

* * * * *

UNITED STATES PATENT AND TRADEMARK OFFICE
CERTIFICATE OF CORRECTION

PATENT NO. : 6,769,339 B2
DATED : August 3, 2004
INVENTOR(S) : Tiamson et al.

It is certified that error appears in the above-identified patent and that said Letters Patent is hereby corrected as shown below:

<u>Column 12,</u>
Line 46, "retaining bar" should read -- retainer --.

Signed and Sealed this

Twenty-first Day of September, 2004

JON W. DUDAS
*Director of the United States Patent and Trademark Office*